United States Patent

Goetz, Jr.

[15] 3,651,257

[45] Mar. 21, 1972

[54] MOUNTING BRACKET FOR TELEVISION PICTURE TUBE

[72] Inventor: Frederick J. Goetz, Jr., Arlington Heights, Ill.

[73] Assignee: Motorola, Inc., Franklin Park, Ill.

[22] Filed: Oct. 19, 1970

[21] Appl. No.: 81,971

[52] U.S. Cl. ................................178/7.8, 178/7.82, 178/7.9

[51] Int. Cl. ................................H04n 5/645

[58] Field of Search ...................178/7.8, 7.82, 7.9; 248/289, 248/291, 300, 200

[56] References Cited

UNITED STATES PATENTS

| | | | |
|---|---|---|---|
| 3,240,876 | 3/1966 | Whitney | 178/7.82 |
| 3,318,999 | 5/1967 | Taylor | 178/7.82 |
| 3,431,454 | 3/1969 | Sanders | 178/7.9 |

*Primary Examiner*—Robert L. Griffin
*Assistant Examiner*—Joseph A. Orsino, Jr.
*Attorney*—Vincent Rauner and L. Arnold

[57] ABSTRACT

A mounting bracket for mounting a television picture tube in a housing of the type in which the bracket is securable to the housing and is adapted to support the side of the tube, the bracket having a pivotable portion for supporting the peripheral edge of the front screen of the tube. The pivotable portion is pivotable in conformance with positional shifts of the tube and is coverable with a shock-absorbent hood for providing a soft engaging contact with the front screen over an area of contact, which area is substantially maintained throughout the positional shifts of said tube.

8 Claims, 5 Drawing Figures

INVENTOR:
FREDERICK J. GOETZ, JR.
BY
Lester N. Arnold
ATTY.

MOUNTING BRACKET FOR TELEVISION PICTURE TUBE

BACKGROUND

This invention relates to a mounting bracket for mounting a standard type television picture tube in a suitable housing, and more particularly, relates to a mounting bracket having the capability to provide and maintain an area of contact with the front screen of the tube so as to distribute the stresses therebetween over a wide area.

Various mounting brackets, clamps, rings and the like have been employed to mount the enlarged front-end type television picture tube within its encompassing protective housing. All of these mounting devices, with more or less frequency of occurrence, have caused breakage of the tube during positional shifts of the tube within the housing due to: (1) the frangible materials of which tubes are commonly constructed; and (2) the difficulty of providing and maintaining sufficient areas of contact between the devices and the tube over which to more widely distribute the static load or mounting stresses and the peak dynamic stresses that occur therebetween. These areas of contact are to be distinguished from point- or line-type contacts which, of course, tend to concentrate these stresses and to enhance breakage of the tube.

SUMMARY

It is therefore an object of the present invention to provide a mounting bracket which substantially reduces the breakage of frangible picture tubes caused by the overloading of stresses as applied to the tube through a point- or line-type contact.

It is another object of the invention to provide a mounting bracket that supports the tube through areas of contact and which substantially maintains these areas of contact with positional shifts of said tube.

The present invention provides a mounting bracket, a plurality of which are suitable for mounting a television picture tube within its protective housing, which is securable to the housing and includes a pivotable plate for supporting and restraining the front screen of the picture tube over an area of contact with said screen, the plate pivoting with respect to the bracket in an arcuate path to maintain the area of contact with pivotable movement of said tube along said arcuate path whereby the stresses between the pivoting plate and said screen are distributed over the entire area of contact.

THE DRAWING

DETAILED DESCRIPTION

Figure 1:
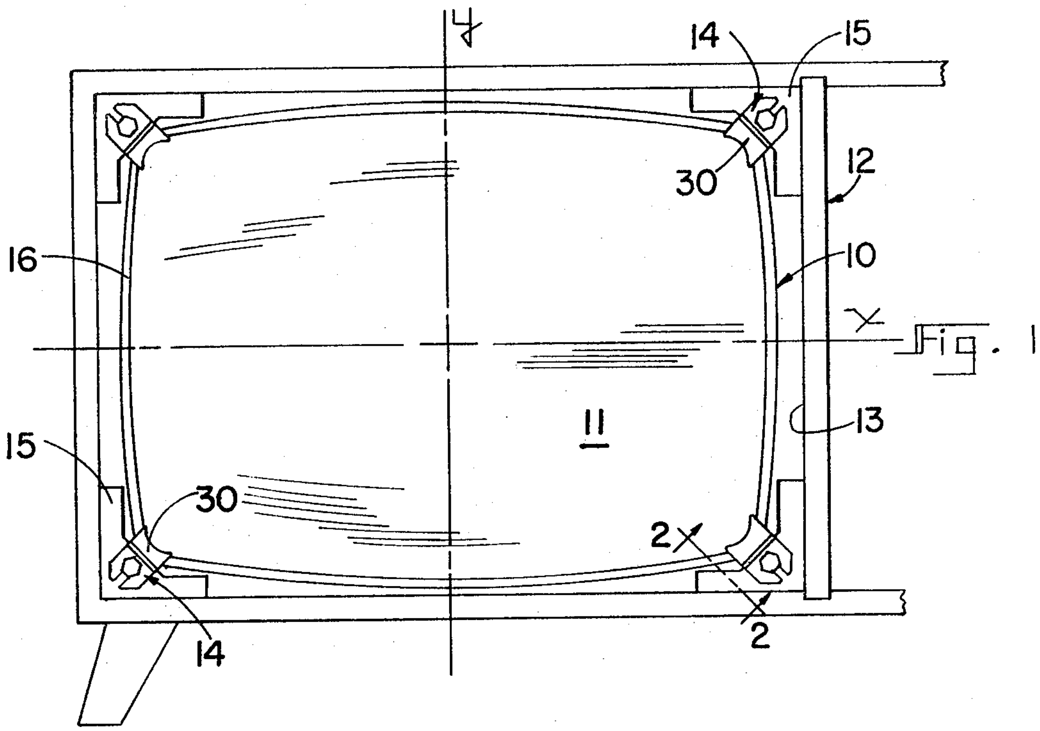
FIG. 1 is an elevational front view of a television picture tube mounted within a portion of a housing by the brackets of the present invention.

In a preferred practice of the invention, FIG. 1 shows a standard type television picture tube 10 including a generally rectangular front image-display screen 11 having an enlarged front end. The picture tube 10 is positioned within a suitable housing, a portion of which is indicated at 12, and has its front image screen 11 centrally displayed through an accommodating opening 13 in a well known manner. The tube 10 is held in its desired position with respect to the housing 12 by a plurality of mounting brackets 14, four of which are shown in FIG. 1 positioned at the four corners of the screen 11, respectively, and attached to angle brackets 15 secured within the corners of the opening 13.

It is quite common in providing suitable means for mounting the picture tube in position within its television housing to provide a plurality of mounting brackets constructed of relatively strong rigid materials for accommodating the accumulated weight of the tube envelope, the rear gun assembly, the yoke assembly, and other apparatus accompanying the picture tube. These rigid brackets, however, when used in direct contact with a frangible glass tube greatly enhance the possibilities of breaking the tube. Several factors that are thought to contribute to the breakage problem are as follows: (1) the frangible material to rigid material contact between the mounting brackets and the tube; (2) the point- or line-type contact between the brackets and the tube that causes concentration of the stresses between the brackets and the tube on said point or along said line; and (3) the positional shifts in tube position within the housing that cause misalignment of the tube with the brackets and which occur when a television set is jarred or moved from one location to another.

A variety of different embodiments for picture tube mounting brackets of the type represented by the brackets 14, have been employed in a generally unsatisfactory attempt to prevent breakage of the tubes. Some of these different brackets have used cumbersome spring-biased mountings directly contacting the tube but which do not adequately support the tube; resilient contact mountings such as rubber have been provided as a coating for rigid support structures but do not adequately yield with positional shifts of the tube. Although some degree of success has been obtained with some of these alternate mounting structures, a great degree of success has been obtained by the novel structure of the present invention.

Figure 2:
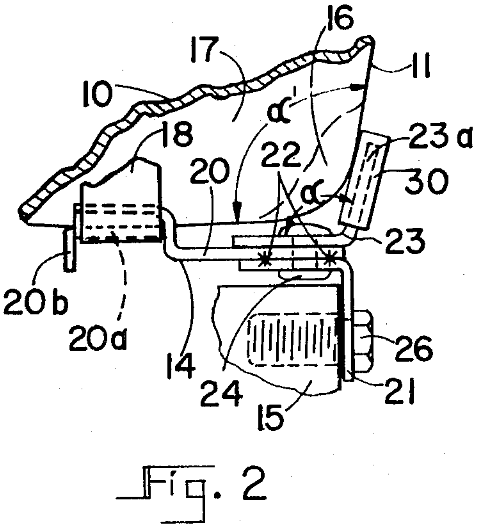
FIG. 2 is a partial sectional view as taken generally along the line 2—2 of FIG. 1, and showing a protective jacket in engagement with a front screen of the picture tube.

The tube 10, FIGS. 1 and 2, is of the standard bell- or funnel-shaped construction and has an enlarged forward end portion providing a glass faceplate as part of the front screen 11 with a circumferential safety rim 16 of relatively thick heavy-duty glass. The safety rim 16 serves as the peripheral edge of the front screen 11. The front screen 11 and the safety rim 16 are joined to sides 17 of the tube in a known manner.

The tube 10 is preferably mounted within the housing 12 by means of four of the mounting brackets 14 and a metal band 18. The metal band encompasses the forward end portion of the tube 10 adjacent the front screen 11, and further joins the mounting brackets 14 together in a manner to be described hereinafter. It is to be understood that the number of brackets 14 used to mount the tube 10 within the housing 12, their placement around the periphery of the tube, and their means of attachment to the housing are matters of choice to the skilled practitioner. However, for the purpose of illustrating the complete application of the present invention, a preferred embodiment, together with a minor alteration thereof, will be described in detail.

A common choice for mounting the tube 10 is to provide for mounting brackets which support and restrain the tube along its sides 17 (preferably along the forward end portion of the tube) to prevent movement of the tube 10 in its radial directions generally perpendicular to the side-supporting portions of the brackets. The brackets 14 also support and restrain the front screen 11 (preferably along the safety rim 16) to prevent forward movement of the tube 10 in an axial direction as along the electron gun axis of the tube. The structural rigidity of the several brackets to act collectively as a mounting unit is provided by the circumferential belt 18, which belt also serves to retard any rearward and forward movement of the tube 10 along its gun axis. Preferably, the belt 18 encompasses the tube 10 approximately in alignment with the center of mass for the tube.

Figure 3:
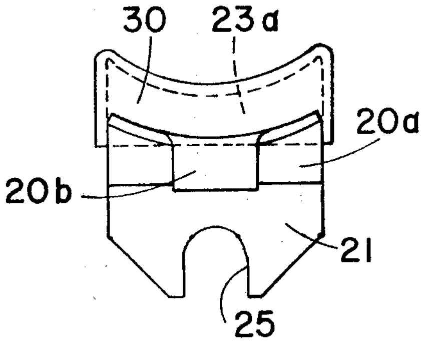
FIG. 3 is a left end view of the mounting bracket of FIG. 2 while omitting the sections of the housing and the picture tube.
Figure 5:
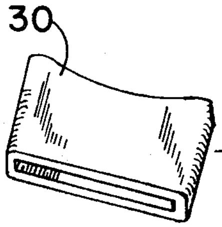
FIG. 5 is a perspective view of the protective jacket.

As shown in FIGS. 1–3, an individual mounting bracket 14 includes a base member or plate 20 in the form of a relatively flat plate having a lengthwise dimension oriented to extend along the side 17 of the tube 10, which extension would be in a direction forwardly and rearwardly of the housing 12. A first angle member or plate 21 is secured to the forward end, the right end as viewed in FIG. 2, of the base plate 20 as by weld points indicated at 22; and a second angle member or plate 23 is pivotably mounted to the forward end of the base plate 20 as by rivet pin 24.

The first angle plate 21 is adapted to be connected to an individual angle bracket 15 which in turn is secured to an interior corner of the opening 13 within the housing 12 in some suitable fashion so as to provide a solid and conveniently located attachment for connecting the associated mounting bracket 14 to the housing 12. In the particular embodiments shown, the first angle plate 21 includes a generally U-shaped groove 25 therein for receiving a bolt 26, FIG. 2, to be threaded into the associated angle bracket 15.

The base plate 20 is provided with a rear, the left end as viewed in FIG. 2, arcuate portion 20*a* that is adapted to support and restrain a selected portion of the side 17 of the tube 10. Desirably, the arcuate portion 20*a* is offset from the base plate 20 in the direction of the tube so as to provide a clearance space, FIG. 2, between the base plate 20 and the side 17 of the tube, which space should be sufficient to prevent the rivet pin 24 or the second angle plate 23 from striking the adjacently mounted tube.

Figure 4:
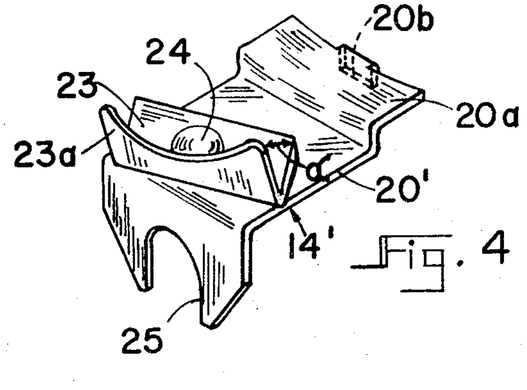
FIG. 4 is a perspective view of an alternative embodiment of the mounting bracket of FIG. 2.

The arcuate portion 20*a* has an inner surface, as shown in FIG. 4, that is generally concave for complementing the radial curvature of the side 17 of the tube 10; and optionally, the inner surface may be slightly inclined (not shown) to generally match the axial curvature of the side 17 in order to provide a complementary restriction on any rearward movement of the tube 10. The arcuate portion 20*a* may directly contact the side 17 of the tube 10, or be provided with a thin coating of some shock-absorbent material such as a soft tape with which to contact the tube. In either configuration, the arcuate portion 20*a* is structured to support the side of the tube 10 over a first area of contact which is to be substantially maintained throughout positional shifts of the tube.

The outer surface of the arcuate portion 20*a* is generally convex, although the curvature need not have a particular correlation with that of the concave inner surface, and provides a convenient mounting surface for the circumferential belt 18. In embracing the several mounting brackets 14 to act concertedly as a mounting means for the tube 10, the belt 18 encircles the periphery of the tube and collectively engages the several arcuate portions 20*a* along the outer surfaces thereof. Additionally, the arcuate portions 20*a* are provided with suitable protrusions or tabs 20*b*, respectively, for preventing the belt 18 from slipping off of these outer surfaces.

The particular dimensions of the base plate 20 are matters of design choice, but the forward end thereof is shown as being relatively flat to facilitate the convenient attachment of the first and second angle plates 21 and 23. However, the flatness of the plate 20 can be altered if desired so long as the angle plate 23 is provided with a suitable base upon which it can be pivotably mounted in accordance with the principles of the present invention.

As stated previously, the angle plate 23 is pivotably secured to the base plate 20 by the rivet 24. The angle plate 23 can be constructed of either the same material as that of base plate 20 and angle plate 21 or it can be an entirely different material so long as the material chosen is sufficiently rigid to adequately support and restrain movement of the tube 10 along its gun axis. Preferably, the angle plate 23 is in the form of a relatively flat plate bent across its intermediate portion at some desired angle, alpha ($\alpha$), to provide a depending or free end portion 23*a*.

The requirement for the angle $\alpha$ is that it be substantially equal to the angle $\alpha'$, FIG. 2, which the front screen 11 forms with the adjoining side 17, and more specifically, that the angle be such as to allow the free end portion 23*a* to support and restrain the tube 10 in its forward axial direction over a second area of contact which is to be substantially maintained throughout positional shifts of the tube. The free end portion 23*a* may directly contact the front screen 11 along the safety rim 16, but more desirably, is provided with a protective hood or jacket 30 constructed of relatively soft flexible and shock-absorbent material such as rubber or resilient plastics, with which to contact the tube. Optionally, the inner surface of the free end portion 23*a* can be provided with a conforming curvature much like that of the arcuate portion 20*a*. In any of these chosen configurations, the free end portion 23*a* is structured to support and restrain the front screen 11 with the second area of contact, so as to disperse the dynamic and static load stresses between the tube 10 and the angle plate 23 over a relatively wide area as compared to a point- or line-type contact.

It has been observed that tube breakage most often occurs through the mounting brackets 14 under conditions which impart inertia to the tube, thereby tending to cause positional shifts of the tube with respect to its mountings. Also, tube breakage most often occurs to the front screen 11. Therefore, it is felt that tube breakage is largely the result of stress concentrations, and that the second or frontal area of contact is then the most critical one to be maintained. Also, the particular size of the frontal area is deemed to be non-critical, so long as the contact area achieved and maintained is sufficiently large to prevent breakage of the tube 10 from the concentration of stress forces.

As viewed in FIG. 1, the front screen 11 can be said to have horizontal and vertical axes $x$ and $y$, respectively, corresponding to radial axes of the tube, and a third axis passing perpendicular to the screen 11 corresponding to the gun axis of the tube. In considering that movement of the tube 10 for which a selected angle plate 23 compensates by its pivotable movement about its pivot axis, it can be readily seen that only rotational movement or torque of the tube 10 about its radial axis generally coplanar to the frontal area of contact and passing through the pivot axis of the angle plate 23 is compensated for. It is to be noted that this is the movement of the tube, with the exception of a direct rearward movement, which would most tend to reduce the frontal area of contact.

Accordingly, the proper mounting for the individual bracket 14 is to generally align the pivot axis of the angle plate 23 to conform to a selected radial axis of the tube 10. Desirably, the particular mounting of the angle plate 23 should be readily pivotable so as to provide for the maximum benefit from the angle plate 23 as it circumscribes an arcuate path about the selected radial axis of the tube 10. Also, the free end portion 23*a* and the hood 30 can be complementarily shaped to the safety rim 16, as is shown in the drawing, so as to contact a maximum area of the rim 16 without unduly obstructing any portion of the viewing area of the front screen 11.

An alternative embodiment of the mounting bracket 14' is shown in FIG. 4 wherein the same reference numerals have been used to designate similar parts. The first angle plate 21 has been eliminated and the free end portion thereof which contained the groove 25 has been provided on the forward end of an alternative base plate 20'. The base plate 20' includes the same arcuate portion 20*a* on its rearward portion and has the angle plate 23 pivotably mounted to its forward portion by the rivet pin 24. The alternative mounting bracket 14' can be used in lieu of the previously described mounting bracket 14 and embodies the same principles thereof.

It is to be understood that while the present invention has been shown and described with reference to the preferred embodiments thereof, the invention is not limited to the precise forms set forth, and that various modifications and changes may be made therein without departing from the spirit and scope of the present invention.

I claim:

1. A mounting bracket for a television picture tube within a housing having a front image screen and an adjoining funnel-shaped side, said bracket comprising a first plate securable to said housing and adapted to support and restrain a preselected portion of the side of said tube over a first area of contact therewith for preventing movement of said tube in a radial direction generally normal to said preselected portion, and a second plate pivotably connected to said first plate for rotational movement about a pivot axis aligned generally parallel with said radial direction and adapted to support and restrain a preselected portion of the front image screen of said tube over a second area of contact for preventing movement of said tube in an axial direction, said second plate pivotable in an arcuate path about said pivot axis for substantially maintaining said second area of contact with pivotable movement of said tube along said arcuate path whereby the stresses between said first and second plates and said tube are distributed over said first and second areas of contact.

2. A mounting bracket as claimed in claim 1 wherein said arcuate path is circumscribed about a radial axis of said tube.

3. A mounting bracket as claimed in claim 1 wherein said second plate includes a first end portion for providing said pivotable connection to said first plate, and a second end portion for providing said support and restraint for the front image screen, said second end portion depending from said first end portion at an angle substantially equal to the angle defined by the connection between said front image screen and the side of said tube.

4. A mounting bracket as claimed in claim 3 wherein said second end portion engages a thickened peripheral edge of said front image screen and has its outer perimeter complementarily shaped so as to extend along said peripheral edge without substantially overlying any other portion of said front image screen.

5. A mounting bracket as claimed in claim 3 wherein said second end portion of said second plate is substantially covered with a protective hood comprised of a relatively soft shock-absorbent material with respect to said screen and second end portion, and engageable with said screen to provide said second area of contact.

6. An assembly of the mounting brackets of claim 1 wherein a plurality of said mounting brackets are circumferentially spaced around said front image screen to provide a corresponding plurality of first areas of contact for collectively preventing movement of said tube in any of its radial directions, and to provide a corresponding plurality of second areas of contact for collectively preventing movement of said tube in said axial direction, all of said second plates pivotable in arcuate paths about their respective pivot axes for substantially maintaining said second areas of contact with positional shifts of said tube which precipitate pivotable movements of said tube along said arcuate paths.

7. An assembly as claimed in claim 6 wherein said first plates are to be collectively linked with each other and with the side of said tube by a circumferential belt to be strapped around the periphery of the side of said tube and over said first plates.

8. An assembly as claimed in claim 6 wherein said front screen is generally rectangular, and the mounting brackets are to be positioned substantially in the corners thereof, respectively.

* * * * *